UNITED STATES PATENT OFFICE.

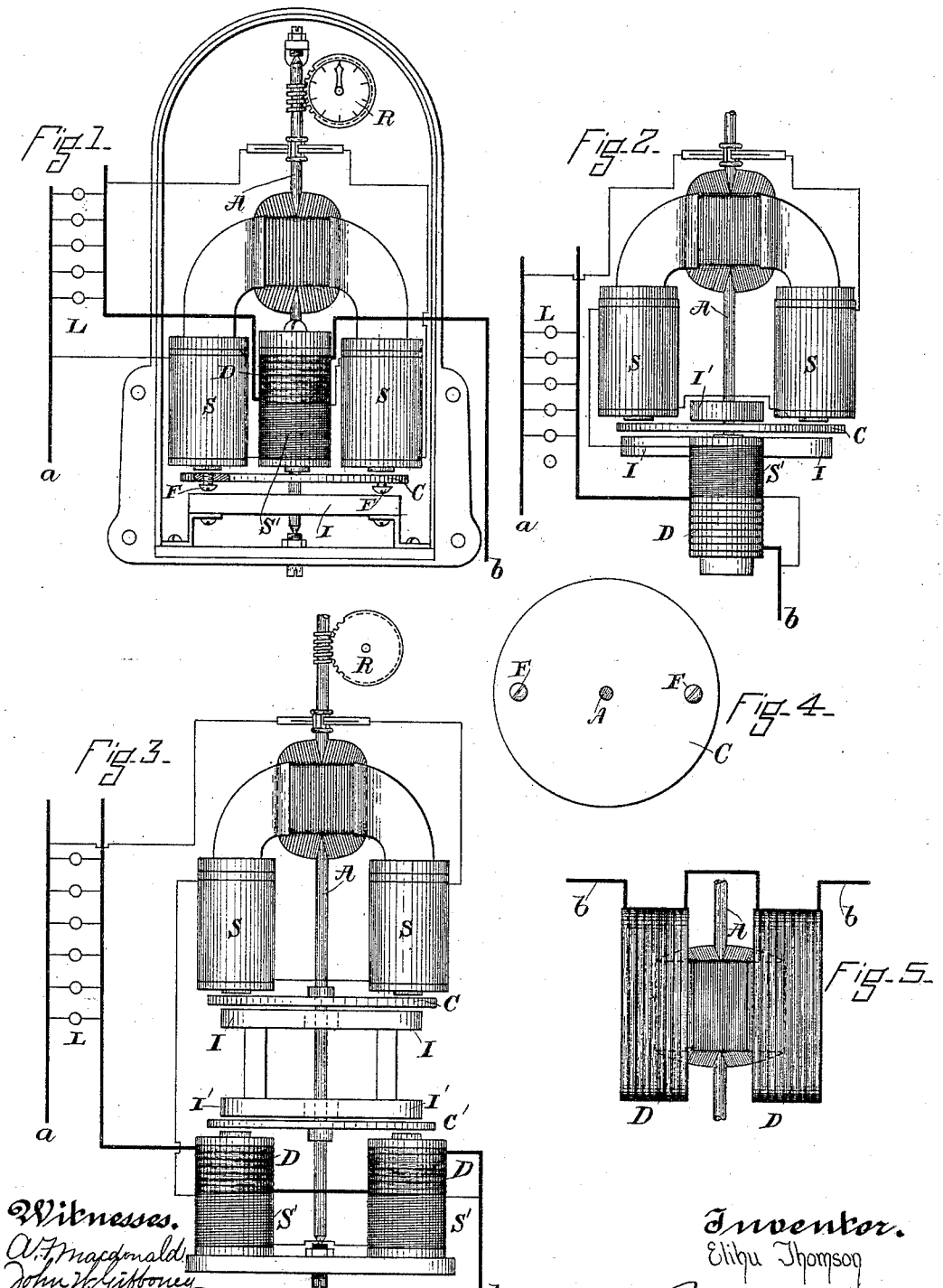

ELIHU THOMSON, OF SWAMPSCOTT, MASSACHUSETTS.

ELECTRIC METER.

SPECIFICATION forming part of Letters Patent No. 448,280, dated March 17, 1891.

Application filed November 20, 1890. Serial No. 372,001. (No model.)

*To all whom it may concern:*

Be it known that I, ELIHU THOMSON, a citizen of the United States, residing at Swampscott, county of Essex, in the State of Massachusetts, have invented a certain new and useful Improvement in Electric Meters, of which the following is a specification.

My present invention relates to an electric meter for properly registering the amount of current flowing in a constant potential work-circuit containing translating devices of any desired description, such as lamps, motors, &c. It comprises a motor-meter in which the motor is retarded by a copper disk or equivalent closed-circuit conductor rotating in a magnetic field of varying strength. The field is so proportioned to the torque of the motor that when no translating devices are in circuit the damping effect will be sufficient to practically stop movement of the motor, or, in fact, to entirely stop it when some special arrangements, such as described hereinafter, are employed. By a differential magnet the strength of the magnetic field is decreased when translating devices are brought into circuit, an amount proportioned to the increase of current flowing in the main circuit, thereby decreasing the retarding influence correspondingly and allowing the motor to run faster and effect a proper registration.

My present improvements consist particularly in an arrangement of parts such that the field-coils of the motor are utilized to create in part or in whole a definite magnetic force which damps the motor, and which is differentiated by the current flowing through a differential magnet-winding included directly in the main circuit, and a magnetic stop device adjusted so as to cause the motor to stop entirely when no lamps are in circuit, thus preventing the giving of a false record.

For the scope of these improvements reference is made to the claims. They are illustrated in the accompanying drawings, wherein—

Figure 1 shows in diagram and in plan one form of the meter. Figs. 2 and 3 represent slightly-modified arrangements. Fig. 4 is a face view of the copper disk, and Fig. 5 is a still further modification.

In the drawings, R represents any suitable form of register, which is driven by a motor of constant torque damped by a copper disk rotating in a magnetic field of varying strength. The motor itself may be of various kinds and arranged in different ways. It is shown herein as an electric motor, the armature-shaft A of which is geared to the register, and which is coupled up in circuit with the mains *a b* by a shunt passing through the field-coils S S and armature. The coils S S produce a magnetic field at the lower extremities of the field-magnets, in which revolves a copper disk C or other closed circuit conductor, carried upon the armature-shaft A. On the side of the disk opposite the poles is a plate or sheet of iron I, which is stationary and serves simply as a carrier of magnetism passing through the disk. A second retarding magnet (shown between the field-magnets) also influences the disk C, and this is wound with two coils differentially. One S' is of comparatively high resistance in circuit with the coils S S, or forms a separate shunt across the mains *a b*. The second or coarse coil D forms a part of the main *b*, which feeds the lamps or other translating devices L in the work-circuit. The damping action due to the coil S' is cumulative with respect to that caused by the field-coils, and together they are sufficient to almost entirely stop the rotation of the motor when no current is flowing in the mains, or to entirely stop it when my magnetic stop device is employed. On putting on the load at L, however, the differential coil D destroys part of the retarding influence—that is, partly neutralizes the effect of the current in the coil S'. This differential action will be proportional to the increase of current in the main circuit, so that when the load is fully on there is practically an entire neutralization of the coil S', and the motor will run fairly uniform at a considerable speed.

To prevent any rotation during the time when there is no load on the work-circuit, a magnetic stop device is provided, which consists of a small mass or masses of magnetic material, seen at F F in the form of screws, permitting adjustment toward or away from the magnet-poles, which tend to stop rotation of the disk when they come opposite the magnet-coil S'. When no translating devices are in circuit, the retarding magnetic field will of course be at a maximum and the screws will be so adjusted as to then stop the motor, while upon the addition of a single lamp in the working-circuit the attraction of the magnet upon the magnetic masses will be insufficient to hold the motor and the register will again start into action.

In Fig. 2 the field-coils S S and armature are connected in a shunt, as before, though in all the different arrangements the shunt across the work-circuit may be replaced by any other source of constant current, my object being simply to secure a rotary motion of definite power. The copper disk C rotates as before in a magnetic field generated by the field-coils S S, and the second differential magnet, though placed on the opposite side, fulfills the same function. I is the magnetic carrier connecting the field-magnet poles, and an iron piece I' serves as a sort of carrier for the magnetism developed by the auxiliary damping-magnet.

In Fig. 3 two copper disks C C' are shown, the former rotating in a field produced by the coils S S and the latter in a second field due to the differential magnets, of which there are two. Magnetic carriers I I' are provided, as before, and the combined action of the two disks in damping the motor is the same as that of the single disk present in the arrangements previously described. In fact the auxiliary disk C' simply takes the place of a portion of the disk C seen in other figures.

In Fig. 5 it is shown that the coils D D are not necessarily wound on an iron core, but may be made of hollow coils inclosing the armature A. In the same way, also, other arrangements may be employed for the purpose of controlling the action of the driving-motor.

What I claim as new, and desire to secure by Letters Patent, is—

1. In an electric meter, the combination of an electric motor of constant torque operating the register with a damping mechanism consisting of a closed-circuit conductor rotating in a magnetic field whose strength is determined by the differentiation between a definite magnetic force produced, in part at least, by the motor itself, and that due to the current flowing in the main work-circuit.

2. In an electric meter, the combination of a motor of constant torque driving the register with a damping mechanism consisting of a closed-circuit conductor rotated in a magnetic field and with magnets for energizing and jointly controlling the strength of said field, comprising a magnet or magnets of substantially constant strength and a differential magnet whose strength is varied proportionally to the current flowing in the work-circuit.

3. In an electric meter, the combination of an electric motor of constant torque included in a shunt across the circuit-mains and a register driven thereby with a damping mechanism consisting of a copper disk or equivalent closed-circuit conductor rotated by the armature-shaft in a magnetic field generated by the field-windings of the motor, and a differential magnet likewise acting on the copper disk and having a definite normal force, which is varied by a winding included directly in one of the mains of the circuit, as described.

4. In an electric meter, the combination of an electric motor of constant torque operating a register with a damping mechanism consisting of a copper disk or like closed-circuit conductor rotating in a magnetic field whose strength is determined by the differentiation between a definite magnetic force and that due to the current flowing in the main circuit, and a magnetic carrier to one side of and in proximity to the disk, for the purpose set forth.

5. In an electric meter, the combination of a motor of constant torque driving the register with a damping mechanism consisting of a copper disk or like closed-circuit conductor rotating in a magnetic field the strength of which increases proportionally to the decrease of current flowing in the main circuit, and a magnetic stop device acting to stop the motor when current ceases to flow in the mains, as described.

6. In an electric meter, the combination of a motor of constant torque driving the register and a damping mechanism comprising a disk of copper rotating in a magnetic field of variable strength, which increases proportionally to the decrease of current in the main circuit, with a magnetic stop device comprising a mass or masses of magnetic material also rotating in the said field, and proportioned so as to stop the motor when the field is at its maximum strength, as described.

7. In an electric meter, the combination of a motor of constant torque driving the register with a damping mechanism consisting of a disk of copper or like closed-circuit conductor rotating in a magnetic field, and a differential magnet having one coil in a shunt of definite resistance across the mains and a second differential coil included directly in one of the mains, whereby the said magnet acts to vary the damping effect upon the motor correspondingly to the amount of current flowing in the main circuit.

8. In an electric meter in which a damping action is secured by the relative movement of a closed conductor and a magnetic field, a stopping device adjusted to check all movement of the meter when the retarding force is at a maximum relatively to the rotating force which propels the meter.

9. In an electric meter in which a copper disk or conductor moves in a magnetic field for retarding the movement given to the meter-train, a magnetic stop device, such as a small magnetic mass carried by the disk, substantially as described.

10. In an electric meter in which a damping action upon the driving-motor is secured by the relative movement of a closed conductor and a magnetic field, a stopping device consisting of a small magnetic mass carried by the closed conductor and adjustable within the magnetic field toward or away from the poles, as described.

11. The combination, with the rotating elements of an electric meter and a motor driving the same, whose speed is kept proportioned to the amount of current flowing in the work-circuit, but is not self-stopping under no load, of a stop device whose retarding action is adjusted to entirely stop the motor under the described condition of the work-circuit, as described.

ELIHU THOMSON.

Witnesses:
JOHN W. GIBBONEY,
FRANCIS O. BLACKWELL.